(12) United States Patent
Fukaya et al.

(10) Patent No.: US 6,505,092 B1
(45) Date of Patent: Jan. 7, 2003

(54) NC MACHINING SUPPORT METHOD AND DEVICE

(75) Inventors: Yasushi Fukaya, Oguchi-cho (JP); Sadayuki Matsumiya, Takatsu-ku (JP); Masayoshi Uneme, Yamatokoriyama (JP); Kazuo Yamazaki, 1500, 7th St. #7-0, Sacramento, CA (US) 95814

(73) Assignees: Okuma Corporation, Nagoya (JP); Mitutoyo Corporation, Kawasaki (JP); Mori Seiki Co., Ltd., Yamatokoriyama (JP); Kazuo Yamazaki, Sacramento, CA (US)

(*) Notice: Subject to any disclaimer, the term of this patent is extended or adjusted under 35 U.S.C. 154(b) by 0 days.

(21) Appl. No.: 09/529,923

(22) PCT Filed: Aug. 24, 1998

(86) PCT No.: PCT/JP98/03745

§ 371 (c)(1),
(2), (4) Date: Apr. 21, 2000

(87) PCT Pub. No.: WO00/11528

PCT Pub. Date: Mar. 2, 2000

(51) Int. Cl.[7] .............................................. G05B 19/42
(52) U.S. Cl. ..................... 700/184; 700/179; 700/183
(58) Field of Search ................. 318/568.1; 700/183, 700/184, 176, 86, 179

(56) References Cited

U.S. PATENT DOCUMENTS

| | | | | |
|---|---|---|---|---|
| 4,521,860 A | * | 6/1985 | Kanematsu et al. | 700/172 |
| 4,556,833 A | * | 12/1985 | Kishi et al. | 318/567 |
| 4,633,409 A | * | 12/1986 | Sekikawa | 318/568.1 |
| 4,891,763 A | * | 1/1990 | Kuriyama | 700/183 |
| 5,029,068 A | * | 7/1991 | Miyata et al. | 700/86 |
| 5,274,562 A | * | 12/1993 | Suzuki | 483/11 |
| 5,293,106 A | * | 3/1994 | Miyamoto | 318/563 |
| 6,036,347 A | * | 3/2000 | Tomita | 700/160 |
| 6,107,768 A | * | 8/2000 | Ouchi et al. | 318/568.1 |

FOREIGN PATENT DOCUMENTS

| | | |
|---|---|---|
| JP | 1-189704 | 7/1989 |
| JP | 3-92906 | 4/1991 |
| JP | 3-179510 | 8/1991 |
| JP | 3-220604 | 9/1991 |
| JP | 4-87754 | 3/1992 |
| JP | 4-268903 | 9/1992 |
| JP | 4-296910 | 10/1992 |
| JP | 5-241637 | 9/1993 |
| JP | 5-274021 | 10/1993 |
| JP | 5-346815 | 12/1993 |
| JP | 6-138934 | 5/1994 |
| JP | 9-62326 | 3/1997 |
| JP | 9-292911 | 11/1997 |
| JP | 10-11123 | 1/1998 |

* cited by examiner

Primary Examiner—Leo Picard
Assistant Examiner—Alexander Kosowski
(74) Attorney, Agent, or Firm—Oliff & Berridge, PLC

(57) ABSTRACT

Machining procedure extracting means extract machining procedures (information about tools, cutting conditions, and the like) based on a machining command of an NC program, and machining procedure outputting means display the machining procedures on a CRT display unit or the like. Thus, a machining operator can easily prepare for machining.

19 Claims, 28 Drawing Sheets

Fig. 4
| NUMBER | SHAPE OF TOOL TO BE USED | CLASSIFICATION OF TOOL | CUTTING CONDITIONS | | | |
|---|---|---|---|---|---|---|
| | | | N rpm | V m/mim | F mm/rev | D mm |
| 1 | 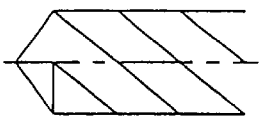 φ18 | DRILL | 354 | 20 | 0.2 | 3.0 |
| 2 | 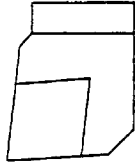 80°/5° | OUTER DIAMETER TURNING | --- | 140 | 0.35 | 4.0 |
| 3 | 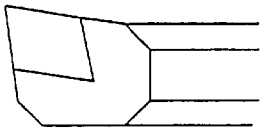 55°/3° | INNER DIAMETER TURNING | --- | 120 | 0.3 | 2.5 |
| 4 | 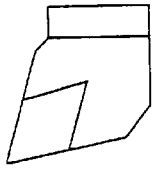 55°/17.5° | OUTER DIAMETER TURNING | --- | 180 | 0.18 | --- |
| 5 | 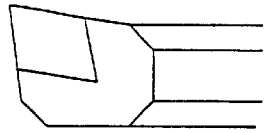 55°/3° | INNER DIAMETER TURNING | --- | 180 | 0.18 | --- |

Fig. 6

| TOOL NUMBER | MACHINING START BLOCK NUMBER | MACHINING END BLOCK NUMBER |
|---|---|---|
| 1 | N0100 | N0111 |
| 2 | N0200 | N0319 |
| 3 | N0400 | N0420 |
| 4 | N0500 | N0618 |
| 5 | N0700 | N0718 |

Fig. 8

| TOOL NUMBER | CUTTING CONDITIONS | | | | | | | |
|---|---|---|---|---|---|---|---|---|
| | SPINDLE SPEED | | CUTTING SPEED | | FEED RATE | | CUTTING DEPTH | |
| | COMMAND VALUE | BLOCK NUMBER | COMMAND VALUE | BLOCK NUMBER | COMMAND VALUE | BLOCK NUMBER | COMMAND VALUE | BLOCK NUMBER |
| 1 | 354 | N0103 | ---- | ----- | 0.20 | N0104 | 3.0 | N0104 |
| 2 | ---- | ----- | 140 | N0202 | 0.35 | N0203 | 3.0 | N0203 |
| | ---- | ----- | 140 | N0303 | 0.35 | N0304 | 8.0 | N0304 |
| 3 | ---- | ----- | 120 | N0403 | 0.30 | N0404 | 5.0 | N0404 |
| 4 | ---- | ----- | 180 | N0503 | 0.18 | N0507 | ---- | ----- |
| | ---- | ----- | 180 | N0604 | 0.18 | N0608 | ---- | ----- |
| 5 | ---- | ----- | 180 | N0704 | 0.18 | N0708 | ---- | ----- |

Fig. 11A
| TOOL NUMBER | TOOL ROUTE | TOOL ROUTE START BLOCK NUMBER | TOOL ROUTE END BLOCK NUMBER |
|---|---|---|---|
| 1 |  | N0100 | N0109 |
| 2 |  | N0200 | N0214 |
| 2 | 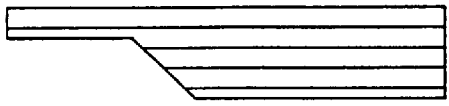 | N0300 | N0317 |
| 3 | 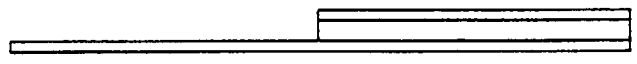 | N0400 | N0419 |

Fig. 13

| TOOL NUMBER | CLASSIFICATION OF TOOL | CLASSIFICATION OF MACHINING |
|---|---|---|
| 1 | DRILL | DRILLING |
| 2 | OUTER DIAMETER TURNING | OUTER DIAMETER END SURFACE ROUGH MACHINING |
| | | OUTER DIAMETER LONGITUDINAL ROUGH MACHINING |
| 3 | INNER DIAMETER TURNING | INNER DIAMETER LONGITUDINAL ROUGH MACHINING |
| 4 | OUTER DIAMETER TURNING | OUTER DIAMETER END SURFACE FINISH MACHINING |
| | | OUTER DIAMETER LONGITUDINAL FINISH MACHINING |
| 5 | INNER DIAMETER TURNING | INNER DIAMETER LONGITUDINAL FINISH MACHINING |

Fig. 15A
| TOOL NUMBER | SHAPE OF TOOL | WORK PIECE MODEL |
|---|---|---|
| 1 | 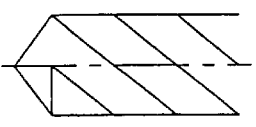 |  |
| 2 | 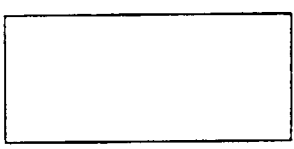 | 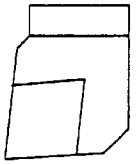 |
| 3 |  |  |

Fig. 15B
| TOOL NUMBER | SHAPE OF TOOL | WORK PIECE MODEL |
|---|---|---|
| 4 | 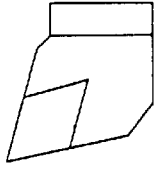 | 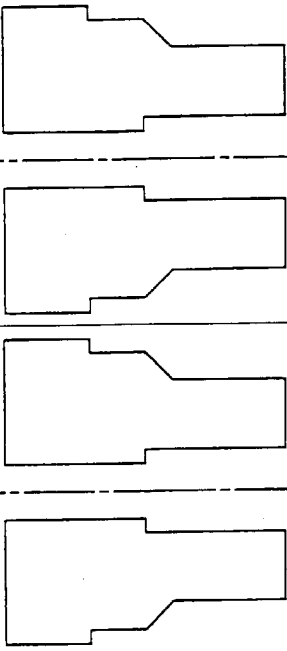 |
| 5 | 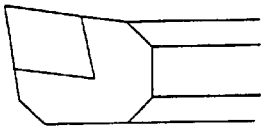 | 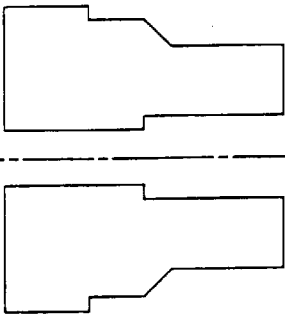 |

Fig. 17A
| TOOL NUMBER | AREA TO BE MACHINED |
|---|---|
| 1 | 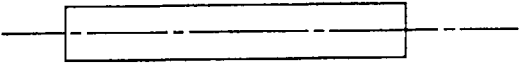 |
| 2 | 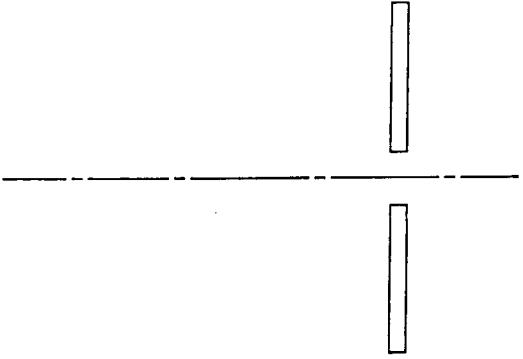 |
| 3 | 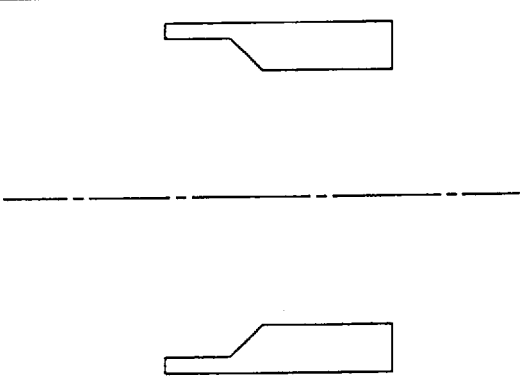 |

Fig. 17B

| TOOL NUMBER | AREA TO BE MACHINED |
|---|---|
| 4 | |
| 5 | |

Fig. 19

| TOOL NUMBER | TOOL FITTING DIMENSION | OPTIMUM CUTTING CONDISIONS | | | |
|---|---|---|---|---|---|
| | | SPINDLE SPEED | CUTTING SPEED | FEED RATE | CUTTING DEPTH |
| 1 | 124.0 | 354 | ------- | 0.18 | 2.7 |
| 2 | 40.0 | ------- | 140 | 0.35 | 3.0 |
| | | ------- | 140 | 0.35 | 8.0 |
| 3 | 115.0 | ------- | 120 | 0.27 | 4.5 |
| 4 | 40.0 | ------- | 180 | 0.18 | ------- |
| | | ------- | 180 | 0.18 | ------- |
| 5 | 115.0 | ------- | 180 | 0.18 | ------- |

Fig. 20A

```
(1st Process:DRILL                          )
(          :Start Block No. =N0100          )
(          :End Block No. =N0111            )
(          :Tool No. =1                     )
(          :Spindle Speed=354rpm            )
(          :Feedrate=0.20mm/rev             )
(          :Cutting Depth=3.0mm             )
(2nd Process:ROUGH-FACE                     )
(          :Start Block No. =N0200          )
(          :End Block No. =N0215            )
(          :Tool No. =2                     )
(          :Cutting Speed=140m/min          )
(          :Feedrate=0.35mm/rev             )
(          :Cutting Depth=3.0mm             )
(3rd Process:ROUGH-OUTSIDE                  )
(          :Start Block No. =N0300          )
(          :End Block No. =N0319            )
(          :Tool No. =2                     )
(          :Cutting Speed=140m/min          )
(          :Feedrate=0.35mm/rev             )
(          :Cutting Depth=8.0mm             )
(4th Process:ROUGH-INSIDE                   )
(          :Start Block No. =N0400          )
(          :End Block No. =N0420            )
(          :Tool No. =3                     )
(          :Cutting Speed=120m/min          )
(          :Feedrate=0.30mm/rev             )
(          :Cutting Depth=5.0mm             )
(5th Process:FINISH-FACE                    )
(          :Start Block No. =N0500          )
(          :End Block No. =N0513            )
(          :Tool No. =4                     )
(          :Cutting Speed=180m/min          )
(          :Feedrate=0.18mm/rev             )
(6th Process:FINISH-OUTSIDE                 )
(          :Start Block No. =N0600          )
(          :End Block No. =N0618            )
(          :Tool No. =4                     )
(          :Cutting Speed=180m/min          )
(          :Feedrate=0.18mm/rev             )
(7th Process:FINISH-INSIDE                  )
(          :Start Block No. =N0700          )
(          :End Block No. =N0718            )
(          :Tool No. =5                     )
(          :Cutting Speed=180m/min          )
(          :Feedrate=0.18mm/rev             )
N0001 G00 X500 Z800
N0002 G50 S3500
```

Fig. 20B

```
N0100 G00 X0 Z109 T010101
(Tool No.=1, Tool Kind=DRILL, Process=DRILL)
N0101 M08
N0102 Z108
N0103 S354 M41 M03
(Spindle Speed=354rpm)
N0104 G74 X0 Z0 D3 L36 F0.2
(Feedrate=0.20mm/rev, Cutting Depth=3.0mm)
N0105 G00 Z0.75
N0106 G01 Z-8.408 F0.1
N0107 G04 F0.33
N0108 G00 Z108
N0109 Z109
N0110 M09
N0111 X500 Z800
N0200 G00 X120.4 Z109 T020202
(Tool No.=2, Tool Kind=OUTSIDE, Process=ROUGH-FACE)
N0201 M08
N0202 G96 S140
(Cutting Speed=140m/min)
N0203 G85 N0204 D3 F0.35 M85
(Feedrate=0.35mm/rev, Cutting Depth=3.0mm)
N0204 G83
N0205 G01 X110 Z100.2
N0206 Z105
N0207 X18
N0208 Z100.2
N0209 G82
N0210 G00 X112.4 Z100.2 G41
N0211 G01 X15.6 E0.35
N0212 G40
N0213 G80
N0214 G00 Z109
N0215 M09
N0300 G00 X118 T020202
(Tool No.=2, Tool Kind=OUTSIDE, Process=ROUGH-OUTSIDE)
N0301 M08
N0302 Z105.4
N0303 G96 S140
(Cutting Speed=140m/min)
N0304 G85 N0305 D8 F0.35 M85
(Feedrate=0.35mm/rev, Cutting Depth=8.0mm)
N0305 G83
N0306 G01 X80.4 Z100.2
N0307 X110
N0308 Z30
N0309 G81
N0310 G00 X80.4 Z101.4 G42
N0311 G01 Z60.083 E0.35
N0312 X100.4 Z50.083
N0313 Z30.2
N0314 X112.4 E0.525
N0315 G40
N0316 G80
N0317 G00 X118
N0318 M09
N0319 X500 Z800
```

Fig. 20C

```
N0400 G00 X16 Z109 T030303
    (Tool No.=3, Tool Kind=INSIDE, Process=ROUGH-INSIDE)
N0401 M42 M08
N0402 Z105.4
N0403 G96 S120
    (Cutting Speed=120m/min)
N0404 G85 N0405 D5 F0.3 M85
    (Feedrate=0.30mm/rev, Cutting Depth=5.0mm)
N0405 G83
N0406 G01 X29.6 Z100.2
N0407 X18
N0408 Z0
N0409 X19.6
N0410 G81
N0411 G00 X29.6 Z101.2 G41
N0412 G01 Z50.2 E0.3
N0413 X19.6 E0.45
N0414 Z-1 E0.3
N0415 G40
N0416 G80
N0417 G00 X16
N0418 M09
N0419 Z109
N0420 X500 Z800
N0500 G00 X84 Z109 T040404
    (Tool No.=4, Tool Kind=OUTSIDE, Process=FINISH-FACE)
N0501 M41 M08
N0502 Z102
N0503 G96 S180
    (Cutting Speed=180m/min)
N0504 G87 N0505
N0505 G82
N0506 G00 Z100
N0507 G01 X80.8 G41 F0.18
    (Feedrate=0.18mm/rev)
N0508 X29.2
N0509 G40
N0510 G80
N0511 G01 X31.4 Z100.1
N0512 G00 Z109
N0513 M09
```

Fig. 20D

```
N0600  G00  X118  T040404
       (Tool No.=4, Tool Kind=OUTSIDE, Process=FINISH-OUTSIDE)
N0601  M08
N0602  Z102
N0603  X84
N0604  G96  S180
       (Cutting Speed=180m/min)
N0605  G87  N0606
N0606  G81
N0607  G00  X80
N0608  G01  Z100.4  G42  F0.18
       (Feedrate=0.18mm/rev)
N0609  Z60
N0610  X100  Z50
N0611  Z30
N0612  X110.8
N0613  G40
N0614  G80
N0615  G01  X111  Z31.1
N0616  G00  X118
N0617  M09
N0618  X500  Z800
N0700  G00  X16  Z109  T050505
       (Tool No.=5, Tool Kind=INSIDE, Process=FINISH-INSIDE)
N0701  M42  M08
N0702  Z102
N0703  X28
N0704  G96  S180
       (Cutting Speed=180m/min)
N0705  G87  N0706
N0706  G81
N0707  G00  X30
N0708  G01  Z100.4  G41  F0.18
       (Feedrate=0.18mm/rev)
N0709  Z50
N0710  X20
N0711  Z-0.4
N0712  G40
N0713  G80
N0714  G01  X19.8  Z0.7
N0715  G00  X16
N0716  M05  M09
N0717  Z109
N0718  X500  Z800
N0719  M02
```

NC MACHINING SUPPORT METHOD AND DEVICE

TECHNICAL FIELD

The present invention relates to a device for supporting preparatory work of machine operators who extract, generate, and download various information from numerical control (NC) programs prepared for NC machining in which all machining control carried out using numerical control information, and who operate actual numerically controlled machine tools using the NC programs.

BACKGROUND ART

The operation of numerically controlled machine tools can be automatically controlled by inputting NC programs, and such machine tools are now widely used in many industrial fields. Computerized numerically controlled machine tools (CNC machine tools) are used in combination with microprocessing, power electronics, and software technology.

Generally, numerical control information, such as an NC program, comprises a tool selection command, a spindle speed command, a cutting speed command, a feed rate command, a spindle movement/interpolation command, miscellaneous function command, or the like, and numerical control information suitable for the machine tool which is to be the object of machining control is prepared in the form of an NC program as occasion demands.

Generally, such an NC program is prepared by an NC programmer in a programming section, or else is automatically prepared by inputting data concerning classifications of machining, areas to be machined, data of materials, shapes of parts, or the like into a device such as a CAD-CAM system, automatic programming unit, or the like. In either case, an NC programmer determines the areas to be machined based on drawings for machining which illustrate shapes of materials and shapes of parts, and then further determines machining procedures, such as tools to be used for machining the respective areas, routes of the respective tools at the time of machining, cutting conditions, and machining order. The NC program is then individually prepared or prepared by inputting data required for the automatic programming unit mentioned above. A machining operator carries out adjustment (editing for correction) of the NC program made in the manner described above by the repetition of test cutting using an actual machine tool at a machining site, and completes the NC program for machining so as to use it for machining control of the machine tool.

Further, even when the machining operator operates a machine tool using an NC program which was previously adjusted, when machining circumstances, such as machine tools or tools, differ, the operator will perform similar test cutting so as to adapt the NC program to the present machining circumstance, and will adjust the NC program as occasion demands before using it for machining control of the machine target tool. Such procedures for adjusting NC programs to be carried out by machining operators will be described with reference to the flowchart of FIG. 1 and to FIGS. 2 through 4.

Generally, a machining operator is provided with a drawing for machining as shown in FIG. 2, an NC program as shown in FIG. 3, and a tool list as shown in FIG. 4 as information for preparation of machining. In the drawing for machining of FIG. 2, only shapes and dimensions of materials, shapes and dimensions of parts, and a position of the NC program origin are illustrated. The NC program shown in FIG. 3 comprises a tool selection command, a cutting speed command, a spindle speed command, a feed rate command, a spindle movement/interpolation command, miscellaneous function commands, or the like. These commands are primitive command codes which can be interpreted and executed by a numerically controlled unit, and the primitive command codes are merely arranged in order of execution. Further, the tool list shown in FIG. 4 is made in a simple manner such that for each tool number, a shape of the tool is illustrated and a classification of the tool, the spindle speed, the cutting speed, the feed rate, and the cutting depth are specified. In a column for cutting conditions in the tool list, reference symbols N, V, F, and D represent spindle speed, cutting speed, feed rate, and cutting depth, respectively.

First, the machining operator prepares a tool illustrated in the tool list and furnishes a tool post with the tool at Step 1 shown in FIG. 1. At this time, the tool post must be furnished with a tool of dimensions such that ejection of the tool post furnished with the tool or a tool holder does not interfere with work pieces during the machining operation. For the purposes, the machining operator recognizes a number and shape of the tool to be installed based on the tool list and finds on the NC program spots where the tool number is selected. Based on the spindle movement/interpolation command instructed and shapes of materials and shapes of parts illustrated in the drawing for machining, the machining operator then recognizes the position at which an area to be machined is situated within the overall shapes of materials and parts, and determines an approximate dimension of the ejection. The tool post is then furnished with the tool so that the actual dimension of the ejection meets or exceeds the determined value.

At Step 2, a value of the NC program origin is set and stored in the numerically controlled unit so that the NC program origin is positioned as shown in the drawing for machining. Further, an offset value of the tool installed on the tool top is set and stored in the numerically controlled unit. Further, at Step 3, the NC program is input and stored in the numerically controlled unit. Here, preparatory work for no-load running which will be described hereinafter is completed.

Next, at Step 4, by executing the input NC program, the operator understands and confirms approximate machining operation to be controlled by the NC program during no-load running when no materials are installed. Further, the operator operates each block of the NC program, and precisely understands and confirms machining procedures, such as an area to be machined by each tool, a route of the tool at the time of machining the area, cutting conditions at the time of machining the area, and order of machining each area, referring to the drawing for machining. At the same time, the operator precisely understands and confirms at which locations on the NC program the tool selection command, the spindle speed command, the feed rate command, the spindle movement/interpolation command, the miscellaneous function command, and the like which execute the machining operation are issued. This comprehension and confirmation are preparation for the adjustment of the NC program to be performed while carrying out a test cutting with materials installed. The understanding and confirming work during no-load operation is repeated until the operator gains a clear understanding and confirmation as shown in Step 5. At this point, the test cutting preparation is completed.

The test cutting will be carried out in the following procedures. First, materials are installed at Step 6. At the next Step 7, in order for rapid traverse positioning to be performed at a safety speed, a traverse speed override which usually operates at the fastest speed tolerated for machine tools is regulated to 100 percent or less. Under such a condition that the rapid traverse positioning can be performed at a safety speed, the NC program is operated at Step 8 in block units. By operating the NC program in block units, the operator confirms whether or not the tool, the tool holder, the tool top, or the like interfere with the work pieces. Also, the operator confirms whether or not abnormal oscillation or noise arises during machining. Further, the operator measures the dimensions of the work pieces so as to confirm that the dimensions of the work pieces are within a tolerance, and conducts a careful examination of the surfaces of the work pieces machined so as to confirm whether or not the surfaces have desired roughness (smoothness?).

At Step 9, if the operator judges, after confirmation, that there is a problem which results from the NC program, the NC program will be revised at Step 10. At this time, the operator specifies a location such as where a spindle movement/interpolation command which may cause interference is issued, a location where a cutting condition command which may cause abnormal oscillation or noise is issued, a location where a spindle movement/interpolation command which may cause the dimensions of the work pieces to be out of a desired tolerance is issued, a location where a cutting condition command which may result in undesirable roughness of the surfaces is issued, or some other location, and then revises the specified locations. When such revision is performed, advantage is taken of the understanding and confirming work performed on the NC program during the no-load operation. The aforementioned work, such as test cutting, confirmation of the operation, and revision of the NC program is repeated until no problem arises and therefore the NC program will be suitable for a machining circumstance using the machine tool.

As described above, for the dimension of the ejection to be computed when the tool post is furnished with the tool for test cutting to be carried out by the operator and the adjustment (adjusting work) of the NC program performed during the test cutting, the operator must thoroughly understand the machining procedures, such as the overall flow of machining, each tool, and the area to be machined by the tool, a tool route, cutting conditions, or order of machining from only the limited information (NC program, drawings for machining, tool lists, or the like) provided. As described above, the machining procedures are determined when the NC programmer prepares the NC program. Thus, the machining operator learns of the machining procedures determined by the NC programmer through limited information, such as the NC program, drawings for machining, tool lists, or the like, and the machining operator must understand the machining procedures from such limited information. Further, even for an NC program once put into practical use under certain machining circumstances, such as for a specified tool or the like, the operator must perform the adjustments again when any of the machining circumstances are changed.

The present invention is made in consideration of conventional problems such as described above. An object of the present invention is to realize support for preparation of machining using the NC machine tool by extracting from machining commands on the NC program the information concerning the machining, such as tool numbers, tool routes, cutting conditions, order of machining, after the information is systematically combined, and then supplying the machining operator with the information. Further, the present invention is directed to realize further support for machining preparation by generating an area to be machined and a work piece model which is in the middle of machining after adding information concerning shapes of materials, shapes of parts, and tools, by extracting the machining area and the work piece model after systematically combining them and then by supplying the machining operator with them. Further, it is directed to provide the machining operator with an optimum fitting dimension of the tool to be used for machining or cutting conditions utilizing the information described above, automatically generate, from the NC program made by handwork, data which can be inputted into an NC program generating device, such as a CAD-CAM system, an automatic programming unit, or the like, and provide the data.

DISCLOSURE OF THE INVENTION

The present invention comprises machining procedure extracting means or a machining procedure extracting step which extracts machining procedures according to a machining command on an NC program in NC machining in which all machining control is carried out using the NC program; and machining procedure output means or a machining procedure outputting step which outputs the machining procedures extracted.

Further, the present invention is characterized in that the machining procedure extracting means or the machining procedure extracting step may include cutting condition extracting means or a cutting condition extracting step which combines tool numbers and cutting conditions and extracts these from an NC program, and the machining procedure outputting means or the machining procedure outputting step includes cutting condition outputting means or a cutting condition outputting step which outputs the extracted cutting conditions.

Further, the present invention may be characterized in that the machining procedure extracting means or the machining procedure extracting step further includes tool route generating means or a tool route generating step which combines and generates tool numbers and tool routes from an NC program, and the machining procedure outputting means or the machining procedure outputting step further includes tool route outputting means or a tool route outputting step which outputs the generated tool routes.

Further, the present invention is characterized in that the machining procedure extracting means or the machining procedure extracting step further includes machining type specifying means or a machining type specifying step which combines and specifies tool numbers and classifications of machining from an NC program or the NC program and classifications of tools, and the machining procedure outputting means or the machining procedure outputting step further includes machining type outputting means or a machining type outputting step which outputs the specified machining classifications.

Further, the present invention may be characterized in that the machining procedure extracting means or the machining procedure extracting step further includes machining area generating means or a machining area generating step which combines and generates tool numbers and machining areas from an NC program, shapes of tools, and shapes of materials, and the machining procedure outputting means or the machining procedure outputting step further includes machining area outputting means or a machining area outputting step which outputs the generated machining areas.

Further, the present invention may be characterized in that the machining procedure extracting means or the machining procedure extracting step may further includes work piece model generating means or a work piece model generating step which generates a work piece model at a point of exchanging tools from an NC program, shapes of tools, and shapes of materials each time tools are exchanged, and the machining procedure outputting means or the machining procedure outputting step further includes work piece model outputting means or a work piece model outputting step which outputs the generated work piece model.

Further, the present invention is characterized in that the machining procedure outputting means or the machining procedure outputting step further includes comment outputting means or a comment outputting step which inserts the machining procedures extracted into an NC program in the form of a comment.

Further, the present invention may include fitting dimension computing means or a fitting dimension computing step which computes fitting dimensions of tools to be used for machining according to a machining command on an NC program and fitting dimension outputting means or a fitting dimension outputting step which outputs the computed fitting dimensions.

Further, the present invention may also comprise optimum cutting condition computing means or an optimum cutting condition computing step which computes cutting conditions corresponding to the computed fitting dimensions and optimum cutting condition outputting means or an optimum cutting condition outputting step which outputs the computed cutting conditions.

Further, the present invention may further comprise machining type specifying means or a machining type specifying step which specifies classifications of machining from an NC program or the NC program and classifications of tools, a machining area generating means or the machining area generating step which generates machining areas from the NC program, shapes of tools, and shapes of materials, and means or a step for converting the classifications of machining specified and the machining areas generated into a format which can be inputted in an automatic programming unit.

Further, the present invention may be configured in the form of a medium in which a program to let a computer execute procedures for extracting, storing, and outputting order of machining according to a machining command on an NC program is recorded.

BRIEF DESCRIPTION OF THE DRAWINGS

FIGS. 3A, 3B, and 3C show example NC programs.

FIG. 4 shows an example of tool lists.

FIG. 6 is an NC program contingency table.

FIG. 8 is a table of machining support information concerning cutting conditions.

FIGS. 11A and 11B are tables of machining support information concerning tool routes.

FIG. 13 is a table of machining support information concerning classifications of machining.

FIGS. 15A and 15B are tables of machining support information concerning a work piece model.

FIGS. 17A and 17B are tables of machining support information concerning areas to be machined.

FIG. 19 is a table of machining support information concerning tool fitting dimensions and optimum cutting conditions.

FIGS. 20A, 20B, 20C, and 20D show example NC programs containing inserted comments.

BEST MODE FOR CARRYING OUT THE INVENTION

A preferable embodiment according to the present invention will subsequently be described with reference to the accompanying drawings.

Figure 5:
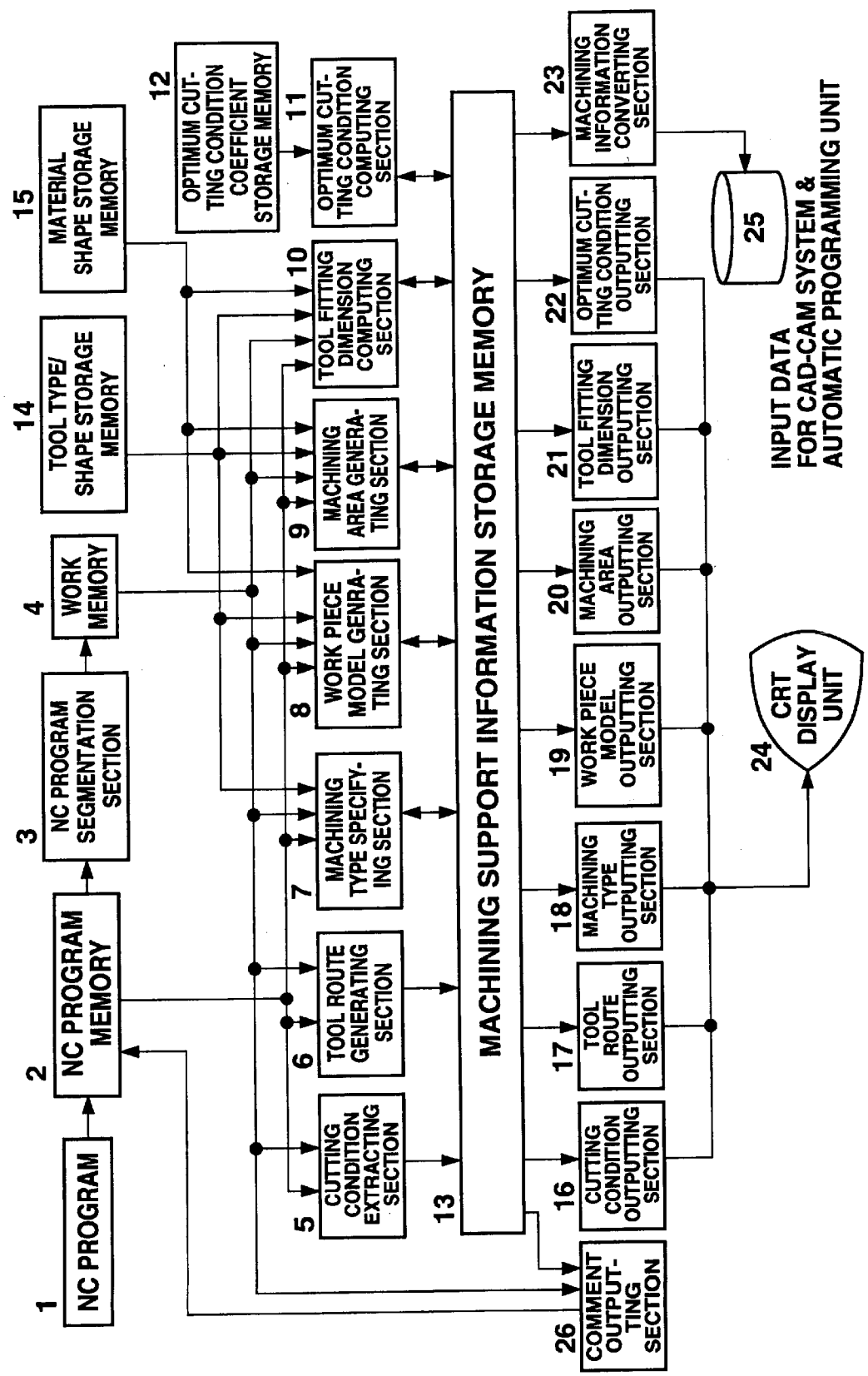
FIG. 5 is a block diagram according to the present invention.

In FIG. 5, an NC machining support device according to the present invention is shown.

First, an NC program 1 is stored in an NC program memory 2. An NC program segmentation section 3 reads out the NC program a, divides the NC program 1 and each tool number instructed by a tool selection command into segments related to machining to be performed with a corresponding tool, and temporarily stores information about the NC program segmentation in a work memory 4 in the form an NC program contingency table such as shown in FIG. 6. In this table, a block number of the NC program 1 which represents a start of machining to be performed using a tool corresponding to the tool number, and a block number of the NC program 1 which represents an end of the machining is stored every tool number. For example for tool number 1, the machining start block number is NO100 and the machining end block number is NO113 and for tool number 2, the machining start block number is NO200 and the machining end block number is NO319.

Figure 7:
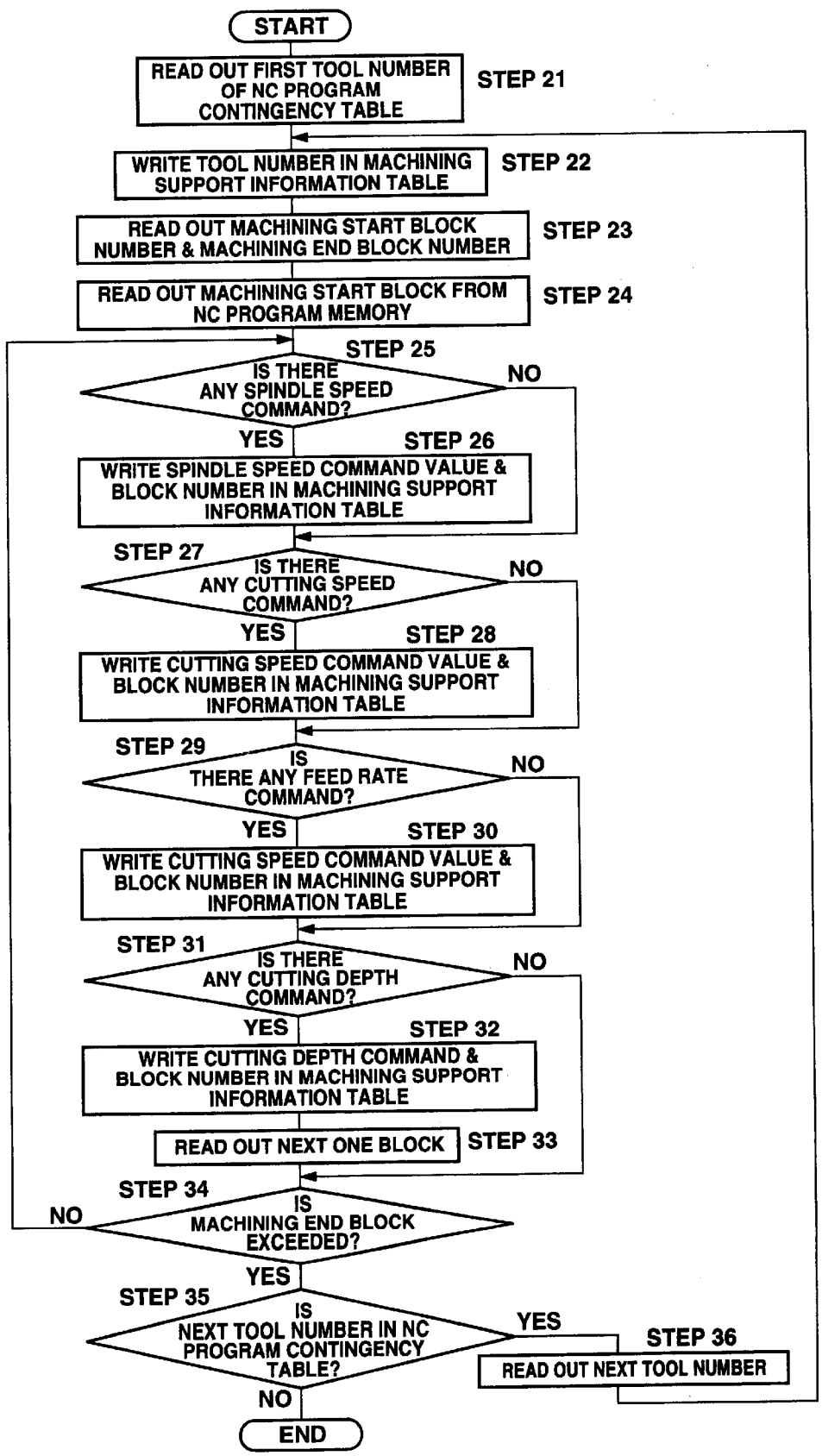
FIG. 7 is a flowchart showing procedures for extracting cutting conditions.

A cutting condition extracting section 5 extracts a command regarding the cutting conditions instructed on the NC program 1 for every tool number which is stored in the NC program contingency table, and stores the command in a machining support information storage memory 13. The extracting procedures will next be described with reference to the flowchart shown in FIG. 7. First, at Step 21, a first tool number of the NC program contingency table stored in the work memory 4 is read out. At Step 22, the tool number is written in a column for tool numbers of the machining support information table in the machining support information storage memory 13. At Step 23, a machining start block number and a machining end block number are read out from the NC program contingency table. At Step 24, the NC program 1 stored in the NC program memory 2 is read out in block units beginning with the machining start block number. At Step 25, it is judged if is the block contains a spindle speed command. If the block contains such a command, the instructed block number and a spindle speed command value will be written at Step 26 in a spindle speed column of the machining support information table. At Step 27, it is judged if there is a cutting speed command in the block. If such a command is present, the block number instructed and a cutting speed command value will be written in a column for the cutting speed of the machining support information table at Step 28. At Step 29, it is then judged if the block contains a feed rate command. If such a command is present, the block number instructed and a feed rate command value will be written at Step 30 in a column for the feed rate of the machining support information table. At Step 31, it is next judged is the block contains a cutting depth command at a fixed cycle used for drilling or rough turning and, if such a command is found, the block number and a cutting depth command value will be written at Step 32 in a column for the cutting depth of the machining support information table. At Step 33, the next block is read out. At Step 34, it is judged if the number of the block exceeds the machining end block number, and, if it not, the program will return to Step 25. If, however, the number of the block does exceed the machining end block number, the program will move to Step 35. At Step 35, it is judged if the next tool number is present in the NC program contingency table. If the next tool number is found, the tool number will be read out at Step 36 and the program will return to Step 22. If the corresponding next tool number is not found, the processing will complete. The machining support information table concerning the cutting conditions as shown in FIG. 8 is stored in the machining support information storage memory 13.

Figure 9:
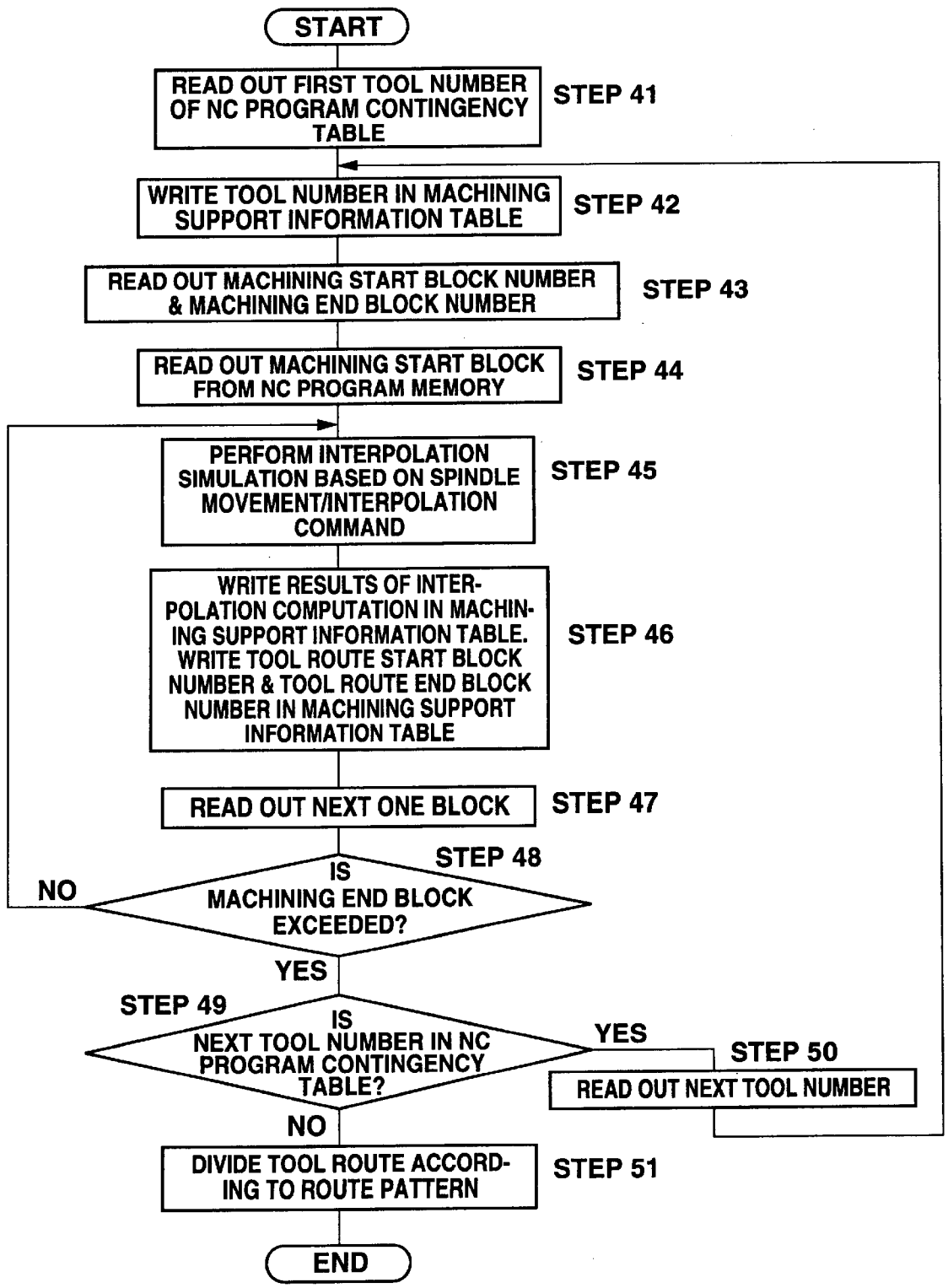
FIG. 9 is a flowchart showing procedures for generating a route of tool.
Figure 10:
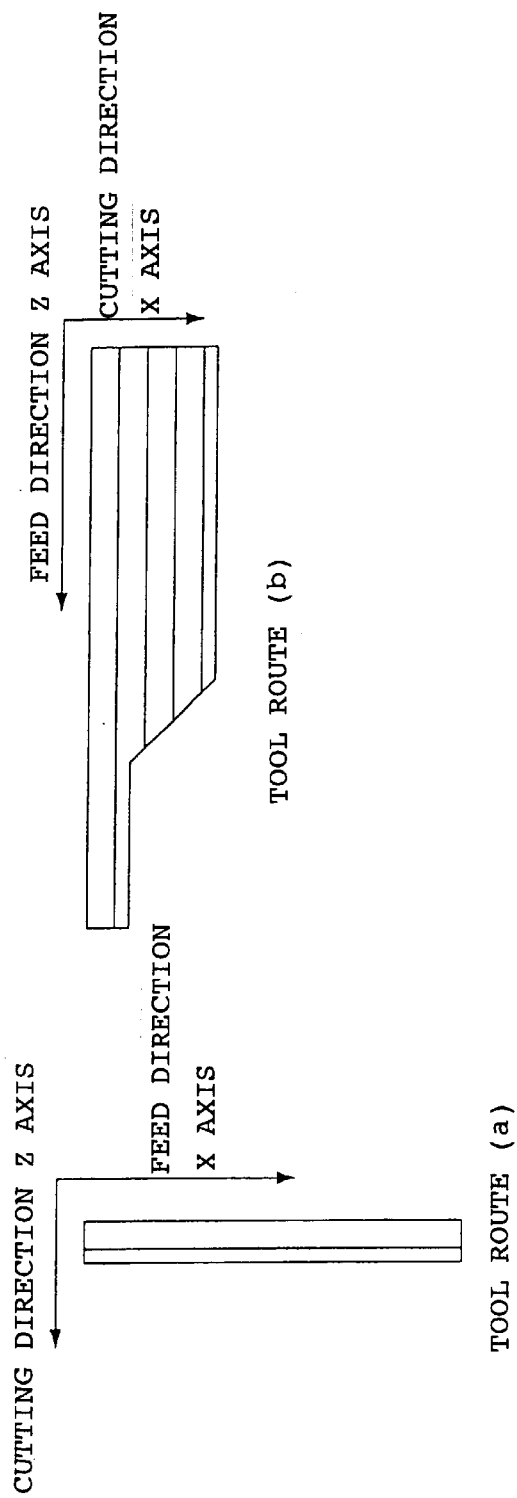
FIG. 10 shows a tool route pattern.
Figure 11B:
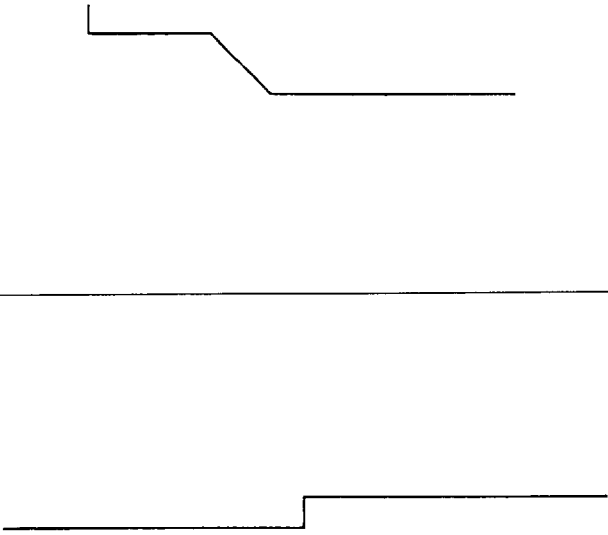

A tool route generating section 6 generates a tool route according to a spindle movement/interpolation command instructed on the NC program 1 for every tool number stored in the NC program contingency table, and stores these tool routes in the machining 6 support information storage memory 13. The generating procedures will be described with reference to the flowchart shown in FIG. 9. First, at Step 41, a first tool number of the NC program contingency table stored in the work memory 4 is read out. At Step 42, the tool number is written in a column for tool numbers of the machining support information table in the machining support information storage memory 13. At Step 43, a machining start block number and a machining end block number are read out from the NC program contingency table. At Step 44, the NC program 1 stored in the NC program memory 2 is read out in block units beginning with the machining start block number. If it is found at Step 45 that the block just read out contains a spindle movement/interpolation command, interpolation processing simulation is carried out according to the command. In the interpolation processing simulation, interpolation computing of only a range from the present position to an indicated target position is performed based on a rapid traverse positioning command, a linear cutting interpolation command, a circular cutting interpolation command, or the like, and the machine tool is not actually driven using the computing results. At Step 46, the results of interpolation computation are written in a column for tool routes of the machining support information table. At this time, the start block number and the end block number of the tool routes are also written. At Step 47, the next block is read out. At Step 48, it is judged if the number of this block exceeds the machining end block number, and, if the number of this block does not exceed the machining end block number, the program will return to Step 45. If, however, the value does exceed, the program will move to Step 49. At Step 49, it is next judged if the next tool number is present in the NC program contingency table. If the corresponding tool number is present, the tool number will be read out at Step 50 and the program will return to Step 42. If not, the program will move to Step 51. At Step 51, a tool route written in the machining support information table is segmented according to route pattern. For example, a tool route corresponding to the tool number 2 is, as shown in FIG. 10, divided into a tool route (a) in a route pattern in which a Z axis represents a cutting direction and an X axis represents a feeding direction, and a tool route (b) in a route pattern in which an X axis represents a cutting direction and a Z axis represents a feeding direction. These routes are written in the column for tool routes of the machining support information table. At this time, the start block number and the end block number of the tool route are converted into the respective start block number and end block number of the separate tool routes, and written in the appropriate column. The machining support information table concerning the tool routes as shown in FIG. 11 is stored in the machining support information storage memory 13.

Figure 12:
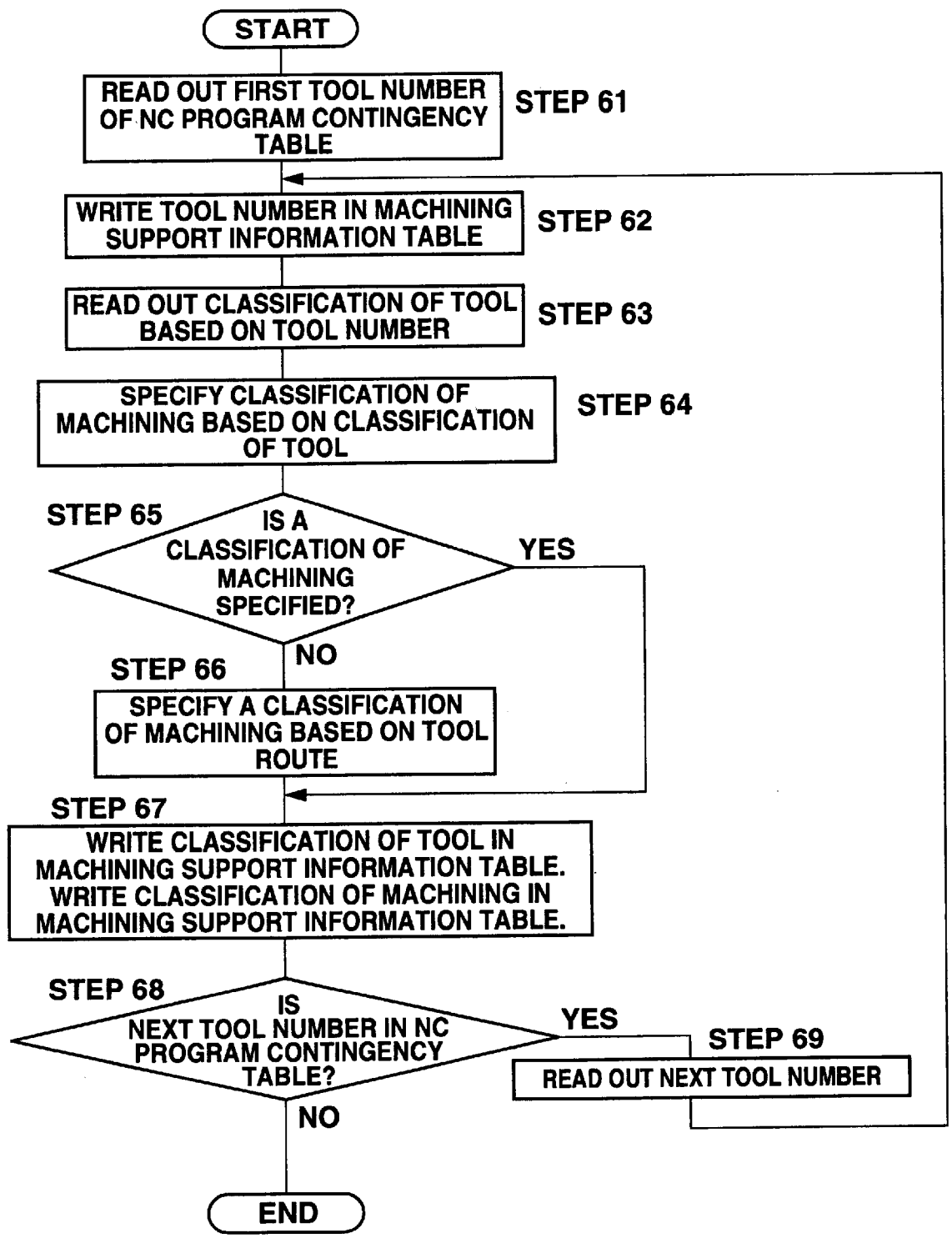
FIG. 12 is a flowchart showing procedures for specifying classifications of machining.

A machining type specifying section 7 specifies a classification of machining for every tool number stored in the NC program contingency table based on a tool selection command and a spindle movement/interpolation command, which are instructed on the NC program 1, and a classification of tool every tool number as previously input in a tool type/shape storage memory 14, and then stores this data in the machining support information storage memory 13. The specifying procedures will be described with reference to the flowchart shown in FIG. 12. First, at Step 61, a first tool number of the NC program contingency table stored in the work memory 4 is read out. At Step 62, the tool number is written in the column for tool numbers of the machining support information table in the machining support information storage memory 13. At Step 63, a classification of tool, stored for every tool number in the tool type/shape storage memory 14, is read out based on the tool number. The tool type/shape storage memory 14 stores a shape of tool and a classification of tool as shown in FIG. 4 for every tool number. At Step 64, a classification of machining is specified based on the classification of the present tool. At this time, while a single classification of machining can often be specified, it is also possible that the specification correlates to a plurality of classifications of machining. For example, if the tool is a drill, the classification of machining will inevitably be drilling. However, if the tool is an outer diameter turning tool, four kinds of machining, outer diameter longitudinal rough machining, outer diameter end face rough machining, outer diameter longitudinal finish machining, and outer diameter end face finish machining will be specified. For an inner diameter turning tool as well, four kinds of machining, inner diameter longitudinal rough machining, inner diameter end face rough machining, inner diameter longitudinal finish machining, and inner diameter end face finish machining will be specified. Therefore, at Step 65, it is judged whether a specific classification of machining is specified. If so, the program will move to Step 67, but, if a plurality of classifications of machining are specified, the program will move to Step 66. At Step 66, based on a tool route previously generated by the tool route generating section 6 according to a spindle movement/interpolation command, a classification of machining is specified from among a plurality of machining classifications. At this time, if there is a plurality of tool routes for a single tool, a classification of machining will be specified every tool route. At Step 67, the classification of tool is written in a column for classifications of tools of the machining support information table, and the classification of machining specified is written in the column for classifications of machining of the machining support information table. At Step 68, it is next judged if the next tool number can be found in the CN program contingency table. If the corresponding tool number is found, the tool number will be read out at Step 69 and the program will return to Step 62. If not, the processing will complete. In such procedures, machining support information concerning the classifications of machining as shown in FIG. 13 is stored in the machining support information storage memory 13. In FIG. 13, with regard to the drill whose tool number is one, at Step 64 the classification of machining is specified to be drilling only, as described above. On the other hand, with regard to the outer diameter turning tool whose tool number is two, again as described above, four kinds of machining, outer diameter longitudinal rough machining, outer diameter end face rough machining, outer diameter longitudinal finish machining, and outer diameter end face finish machining are specified at Step 64. And at Step 66, it is specified as shown in FIG. 10, that the classification of machining of the tool route (a), in which the Z axis represents a cutting direction and the X axis represents a feeding direction, is outer diameter end face rough machining, and the classification of machining of the tool route (b), in which the X axis represents a cutting direction and the Z axis represents a feeding direction, is outer diameter longitudinal rough machining. In the above description, the machining type specifying section 7 specifies a classification of machining using the tool route generated by the tool route generating section 6. However, it is obvious that it may also preferable that the machining type specifying section 7 itself generates a tool route by carrying out an interpolation processing simulation according to a spindle movement/interpolation command on the NC program 1 and then specifies a classification of machining based on results of the generation.

Figure 14:
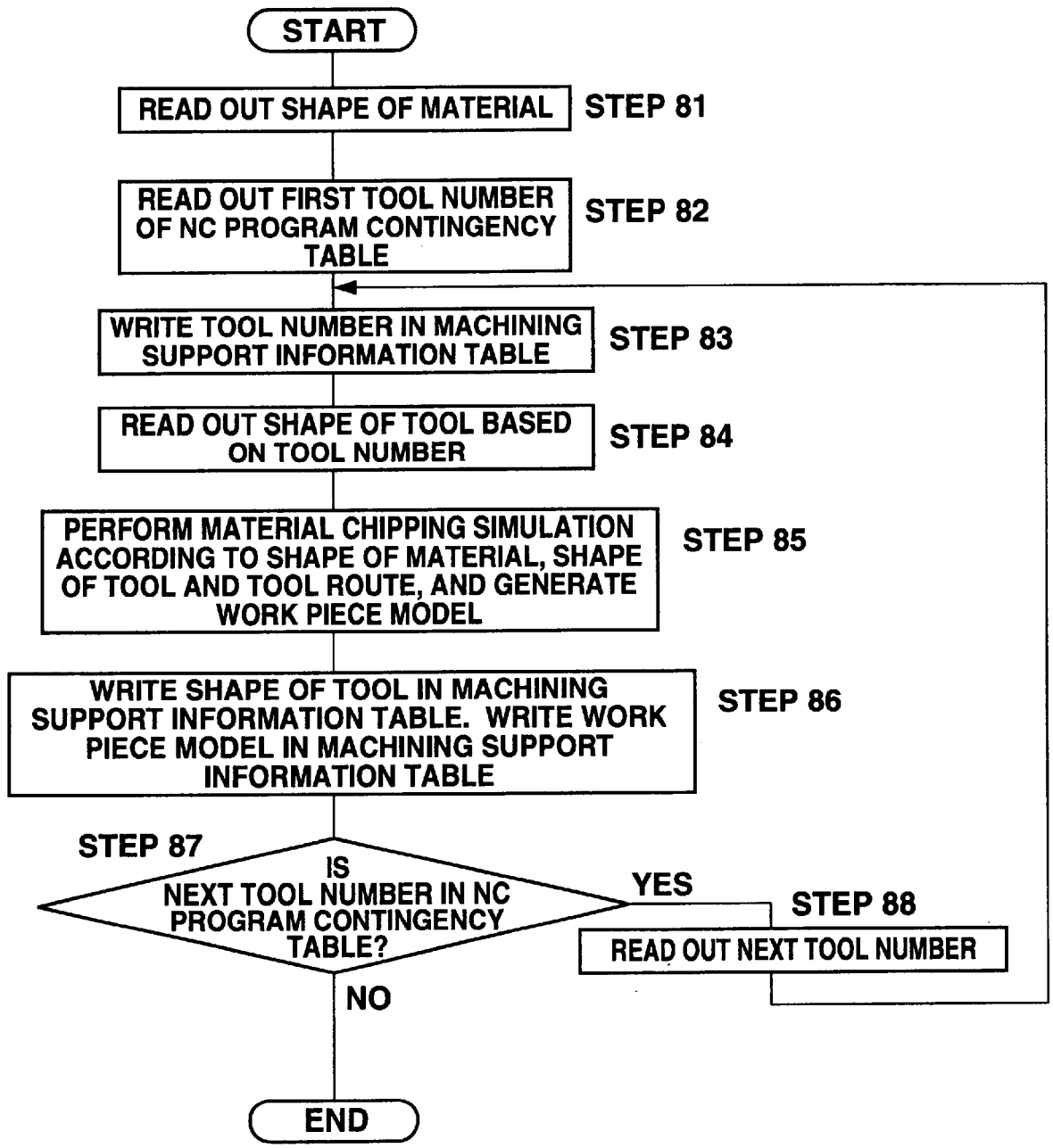
FIG. 14 is a flowchart showing procedures for generating a work piece model.

A work piece model generating section 8 generates, for every tool number stored in the NC program contingency table, a work piece model, at every point where a tool is exchanged, based on a tool selection command and a shift movement/interpolation command, which are instructed on the NC program 1, a shape of every tool previously input and stored in the tool type/shape storage memory 14, and shapes of materials previously input and stored in a material shape storage memory 15. The work piece model generating section 8 then stores the work piece model in the machining support information storage memory 13. The generating procedures will next be described with reference to the flowchart shown in FIG. 14. First, at Step 81, a shape of material is read out from the material shape storage memory 15. At Step 82, a first tool number of the NC program contingency table stored in the work memory 4 is read out. At Step 83, the tool number is written in the column for tool numbers of the machining support information table in the machining support information storage memory 13. At Step 84, a tool shape as stored for every tool number in the tool type/shape storage memory 14 is read out. At Step 85, by moving an edge of the tool along the tool route generated by the tool route generating section 6, a material chipping simulation is performed and a work piece model is generated. At Step 86, the shape of tool is written in a column for shapes of tools of the machining support information, and the work piece model generated is written in a column for work piece models of the machining support information table. At Step 87, it is judged if the next tool number is stored in the NC program contingency table. If the corresponding number is found, the tool number will be read out at Step 88 and the program will return to Step 83. If not, the processing will complete. The machining support information concerning the work piece model at a point of exchanging tools is stored in the machining support information storage memory 13. While in the above description, the work piece model generating section 8 generates a work piece model based on a tool route already generated by the tool route generating section 6, it may obviously also be preferable that the work piece model generating section 8 itself generates a tool route by carrying out an interpolation processing simulation according to a spindle movement/interpolation command on the NC program 1 and generates a work piece model based on results of the generation.

Figure 16:
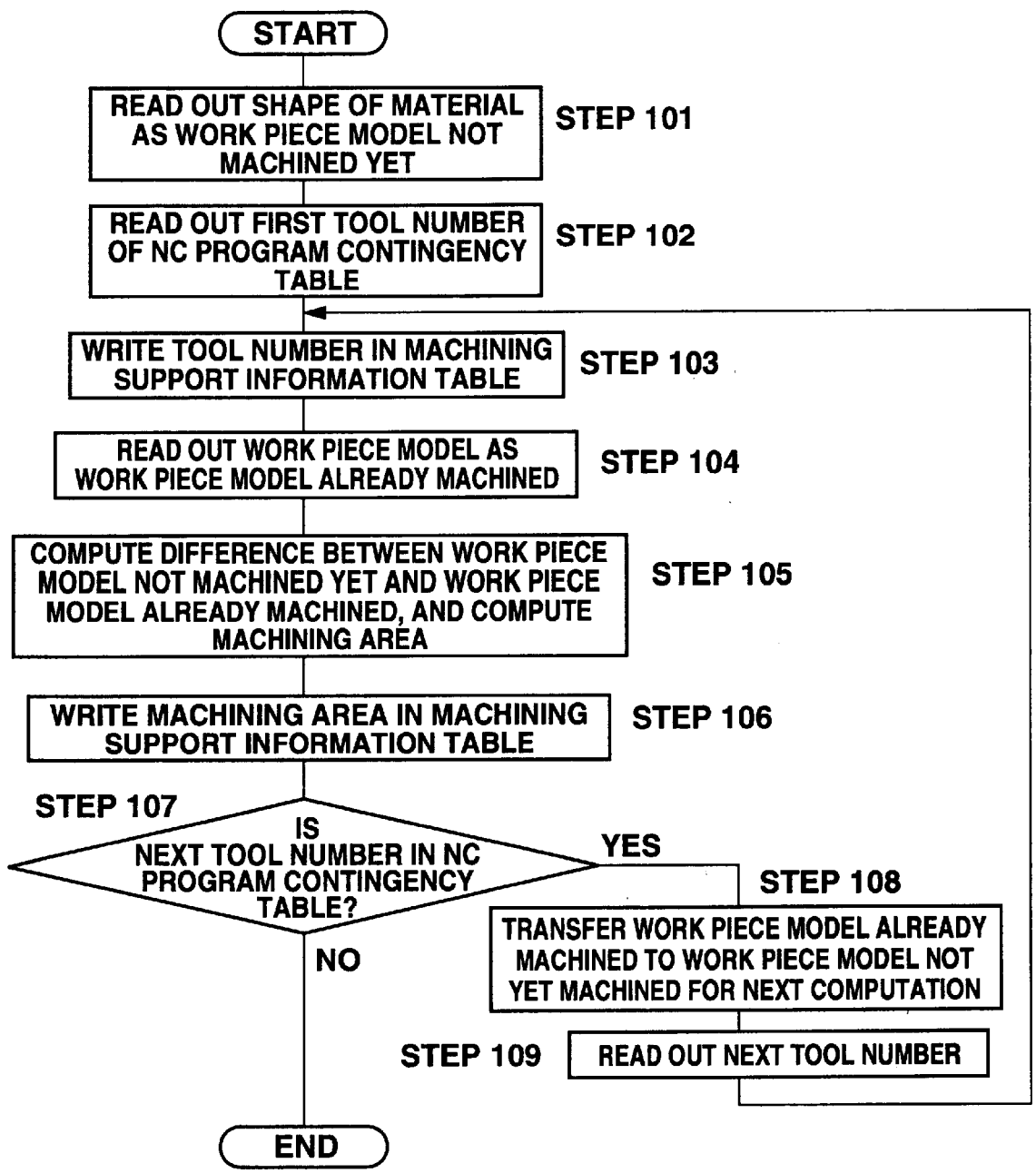
FIG. 16 is a flowchart showing procedures for generating an area to be machined.
Figure 17B:
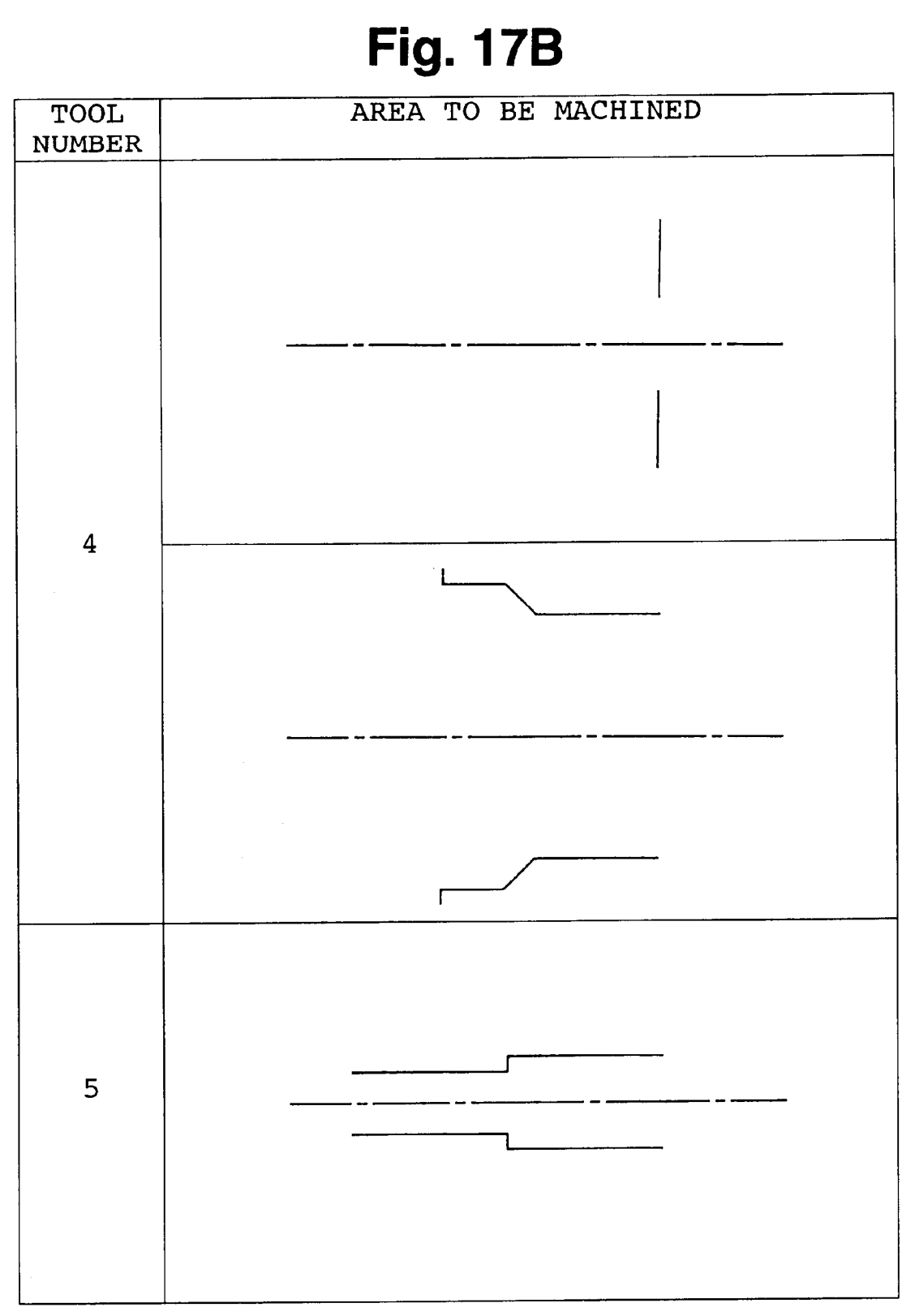

A machining area generating section 9 generates a machining area for every number stored in the NC program contingency table based on a tool selection command and a spindle movement/interpolation command, which are instructed on the NC program 1, a shape of tool every tool number previously inputted and stored in the tool type/shape storage memory 14, and a shape of material stored in the material shape storage memory 15. The machining area generating section 9 then stores the area to be machined in the machining support information storage memory 13. The generating procedures will be described with reference to the flowchart shown in FIG. 16. First, at Step 101, a shape of material is read out from the material shape storage memory 15 as a work piece model which has not yet been machined. At Step 102, a first tool number of the NC program contingency table stored in the work memory 4 is read out. At Step 103, the tool number is written the machining support information table of the machining support information storage memory 13 in the column for tool numbers of At Step 104, the work piece model generated by the work piece model generating section 8 is read out as a work piece model which has already been machined by the tool. At Step 105, a difference between the work piece model before machining and the work piece model after machining is computed, and results of the computation are provided as an area to be machined by the tool. At Step 106, the machining area is written in the column for work piece models of the machining support information table. At Step 107, it is judged if the next tool number can be found in the NC program contingency table. If not, the processing completes. If the corresponding tool number is found, the program will move to Step 108. At Step 108, for the work piece model after machining which is used for computation at Step 105 is substituted a work piece model to be machined by the next tool. At Step 109, the tool number is read out and the program returns to Step 103. The machining support information concerning the machining area as shown in FIG. 17 is stored in the machining support information storage memory. It should be noted that while in the above description, the machining area generating section 9 uses the work piece model already generated by the work piece model generating section 8, it may also be preferable that the machining area generating section 9 itself generates a work piece model based on a tool route, and generates a machining area based on results of the generation.

Figure 18:
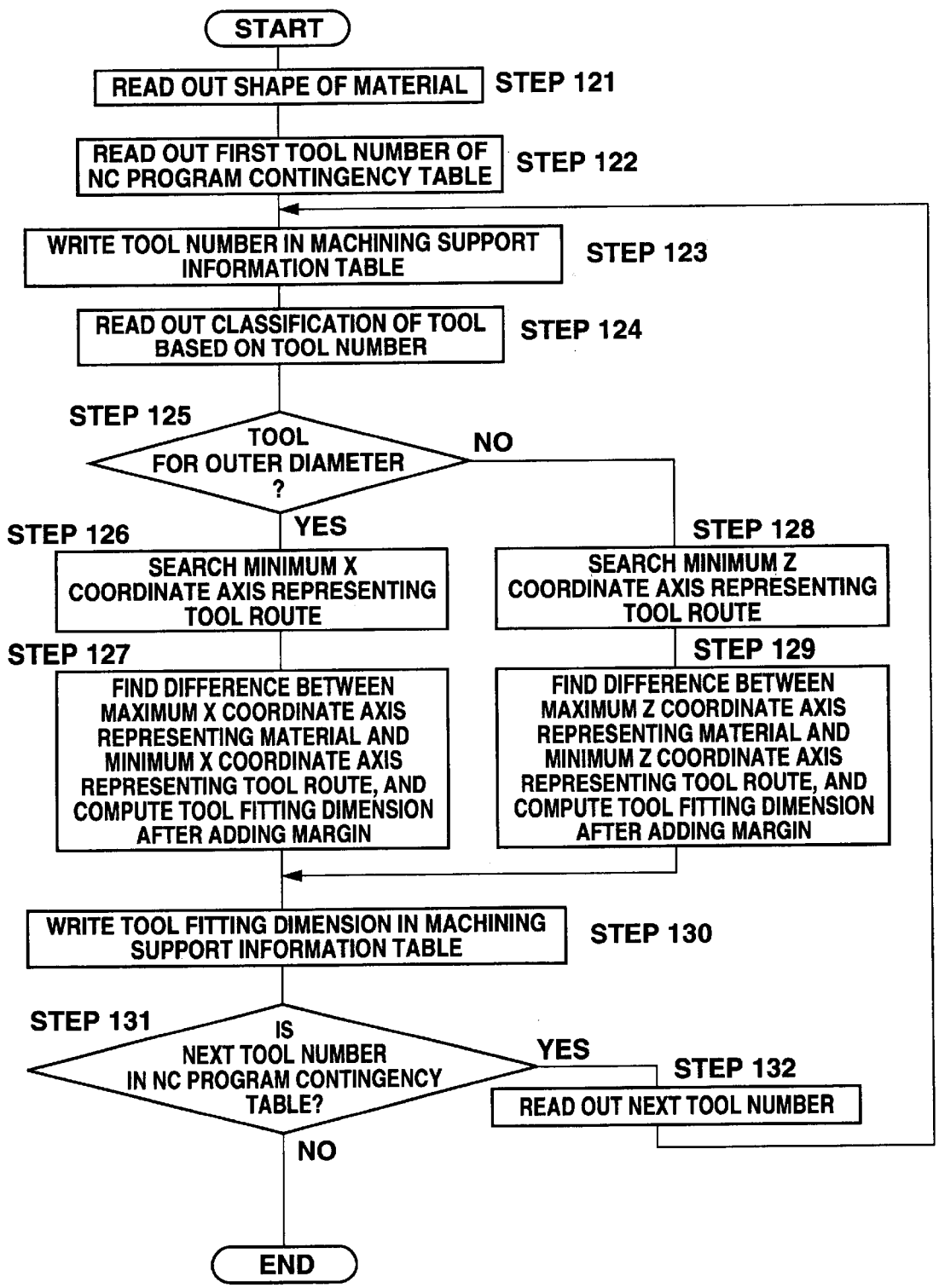
FIG. 18 is a flowchart showing procedures for computing tool fitting dimensions.

Based on a tool selection command and spindle movement/interpolation command included in the NC program 1, a shape of material previously input and stored in the material shape storage memory 15, and a classification of tool previously inputted and stored in the tool type/shape storage memory 14, a tool fitting dimension computing section 10 computes a tool fitting dimension for every tool number stored in the NC contingency table, and stores the dimension in the machining support information storage memory 13. The computing procedures will be described with reference to the flowchart shown in FIG. 18. First, at Step 121, a shape of a material is read out from the material shape storage memory 15. At Step 122, a first tool number of the NC program contingency table stored in the work memory 4 is read out. At Step 123, the tool number is written in the column for tool numbers of the machining support information in the machining support information storage memory 13. At Step 124, based on the tool number, a classification of tool as stored for every tool number in the tool type/shape storage memory 14 is read out. At Step 125, it is judged if the classification of tool read out is an outer diameter machining tool or an inner diameter machining tool. If judged to be an outer diameter machining tool, the program will move to Step 126, if the judgement decides that the tool is an inner diameter machining tool, the program will move to Step 128. At Step 126, the minimum coordinate axis is searched among from X coordinate axes which show a tool route generated by the tool route generating section 6. At Step 127, a difference between the maximum X coordinate axis representing a material and the minimum X coordinate axis representing the tool route searched at Step 126 is found, and then a fitting dimension of the outer diameter machining tool is computed after adding a margin. Similarly at Step 128, the minimum coordinate axis is searched for from among Z coordinate axes which show the tool route generated by the tool route generating section 6. At Step 129, a difference between maximum Z coordinate axis representing the material and the minimum Z coordinate axis representing the tool route searched at Step 128 is found, and then a fitting dimension of the inner diameter machining tool is computed after adding a margin. At Step 130, the calculated fitting dimension is written in a column for fitting dimensions of the machining support information table. At Step 131, it is judged if the NC program contingency table contains the next tool number. If not, the processing will completes. If, however, the corresponding tool number is found, the program will move to Step 132. At Step 132, the tool number is read out and the program returns to Step 123. The machining support information table concerning the tool fitting dimensions as shown in FIG. 19 is stored in the machining support information storage memory 13.

An optimum cutting condition computing section 11 computes cutting conditions corresponding to the tool fitting dimension computed and writes them in a column for optimum cutting conditions within the machining support information table. As a result, the machining support information table concerning the tool fitting dimension and the optimum cutting conditions as shown in FIG. 19 is stored in the machining support information storage memory 13. In this embodiment, computation of the optimum cutting conditions is performed in such a manner that a coefficient of the optimum cutting conditions is previously inputted and stored every fitting dimension in an optimum cutting condition coefficient storage memory 12, the coefficient is readout from the optimum cutting condition coefficient storage memory 12 according to the tool fitting dimension computed, and then the coefficient and the cutting conditions extracted by the cutting condition extracting section are multiplied.

In this embodiment, computation using a coefficient is disclosed, but the method of computation is not restricted in this manner. It may also be preferable that an optimum cutting condition itself be previously input and stored in a memory every tool fitting dimension and that the optimum cutting condition be read out from the memory according to the tool fitting dimension computed, or that an optimum cutting condition is input and stored in a memory as a function of a tool fitting dimension and the optimum cutting condition be computed from the computed tool fitting dimension using the function.

With the constitution described above, according to the present invention, by inputting the NC program 1, classifications of tools, shapes of tools, and shapes of materials, it is possible to automatically extract and generate a tool number and its corresponding cutting condition, a tool number and its corresponding tool route, a tool number and its corresponding classification of machining, a tool number and its corresponding area to be machined, a work piece model at a point of exchanging the tool, a fitting dimension of each tool, and cutting conditions suitable for the fitting dimension.

Next, procedures for adjusting the NC program 1 to be performed by the machining operator shown in FIG. 1 will be described. As mentioned above, when the machining operator prepares tools shown in the tool list and furnishes the tool post with the tools, he or she must arrange the tools in such a dimension of ejection that a tool holder or the tool post furnished with the tools does not interfere the work piece while machining. Heretofore, the operator determines an approximate value of the dimension of ejection based on the NC program 3. or a drawing for machining. However, according to the present invention, the type of machining the tools to be fitted to the tool post will be used for can easily be understood from the information output and displayed on a CRT display unit 24 by a machining type outputting section 18 as shown in FIG. 13. Also, a desired dimension of ejection can be quickly understood from the results output and displayed on the CRT display unit 24 by a tool fitting dimension outputting section 21 in a form as shown in FIG. 19. The dimension of ejection of the tool outputted and displayed is a reliable value because it is a result of the computation by a computer.

Next, during no-load running, the machining operator must gain a basic understanding of the machining operation controlled by the CN program, while confirming this operation. For this step as well, to the operator can easily grasp the machining operation to be performed using the respective tools by glancing at the results output and displayed on the CRT display unit 24 by a tool route outputting section 17 as shown in FIG. 11. Therefore, confirmation can be easily and securely accomplished by comparing the tool route displayed on the CRT display unit 24 with operation of the machine tool. If the operator believes there is a problem with the tool route displayed, the NC program 1 can be modified during no-load running before advancing to the test cutting. Further, since a start block number and an end block number of the tool route are displayed when the NC program 1 is modified, it is easy to find a block which requires modification.

Next, the machining operator allows or causes the numerically controlled unit to set and store the origin of the program and tool offset, and then the machining operator installs materials and performs test cutting. As described above, the machining operator regulates a traverse speed override to 100 percent or less in order for rapid traverse positioning to be performed at a safety speed, and advances the NC program 1 one block at a time. By carrying out the test cutting, the machining operator confirms if the tool, the tool holder, and the tool post do not interfere the work piece and an abnormal oscillation or noise arises while machining. Further, the machining operator measures a dimension of the work piece after machining so as to confirm that it is within a desired dimensional tolerance, and carefully checks a surface of the work piece machined so as to confirm if it has desired roughness.

During such work, from the results output and displayed on the CRT display unit 24 by the tool route outputting section 17 as shown in FIG. 11, it is easy to understand the respective machining operation performed using the respective tools, and from the results output and displayed on the CRT display unit 24 by a machining area outputting section 20 as shown in FIG. 17, it is easy to understand the areas machined by the respective tools. Further, from the results output and displayed on the CRT display unit 24 by a work piece model outputting section 19 as shown in FIG. 15, it is easy to understand a shape of the work piece model at a each point where a tool is exchanged. Further, from the results output and displayed on the CRT display unit 24 by a cutting condition outputting section 16 as shown in FIG. 8, it is easy to understand in what cutting conditions the machining is performed.

If any problem is found as a result of the confirmation made during the test cutting and the problem results from the NC program 1, the NC program 1 will be modified. In such a case, if the spindle movement/interpolation command is to be modified, it is easy to specify the location on the NC program 1 to be modified based on the start block number and the end block number of the tool route outputted and displayed by the tool route outputting section 17. If the cutting conditions must be modified, it will be easy to specify the location on the NC program 1 to be modified based on the block number output and displayed by the cutting condition outputting section 16. Further, the modification can be done while referring to optimum cutting conditions corresponding to tool fitting dimensions which are output and displayed on the CRT display unit 24 by an optimum cutting condition outputting section 22 as shown in FIG. 19.

Further, according to the NC program contingency table stored in the work memory 4, a comment outputting section 26 inserts comments such as a tool number, a classification of tool, cutting conditions, a classification of machining, and the like, into a desired location on the NC program 1 stored in the NC program memory 2, which is then stored in the machining support information storage memory 13. FIG. 20 shows a case in which a comment is inserted based on the NC program 1 shown in FIG. 3. Letters "Start Block No.," "End Block No.," "Tool No.," "Spindle Speed," "Feedrate," "Cutting Depth," and "Cutting Speed" are inserted every classification of machining in order of machining as a comment in the head of the NC program 1 shown in FIG. 20A. Further, on a line next to the block number NO100 shown in FIG. 20B, a comment "Tool No.=1, Tool Kind= DRILL, Process=DRILL" which is corresponding to "tool number 1, a classification of tool: a drill, and classification of machining: drilling" shown in FIG. 13 is inserted. On a line next to the block number NO103, a comment "Spindle Speed=354 rpm" which is corresponding to "spindle speed command value of 354" shown in FIG. 8 is inserted. Further, on a line next to the block number NO104, a comment "Feedrate=0.20 mm/rev, Cutting Depth=3.0 mm" corresponding to "feed rate command value of 0.20 and cutting depth command value of 3.0" shown in FIG. 8 is inserted. Comments are inserted in a similar form in the subsequent blocks of FIG. 20B and in FIGS. 20C and 20D.

Figure 1:
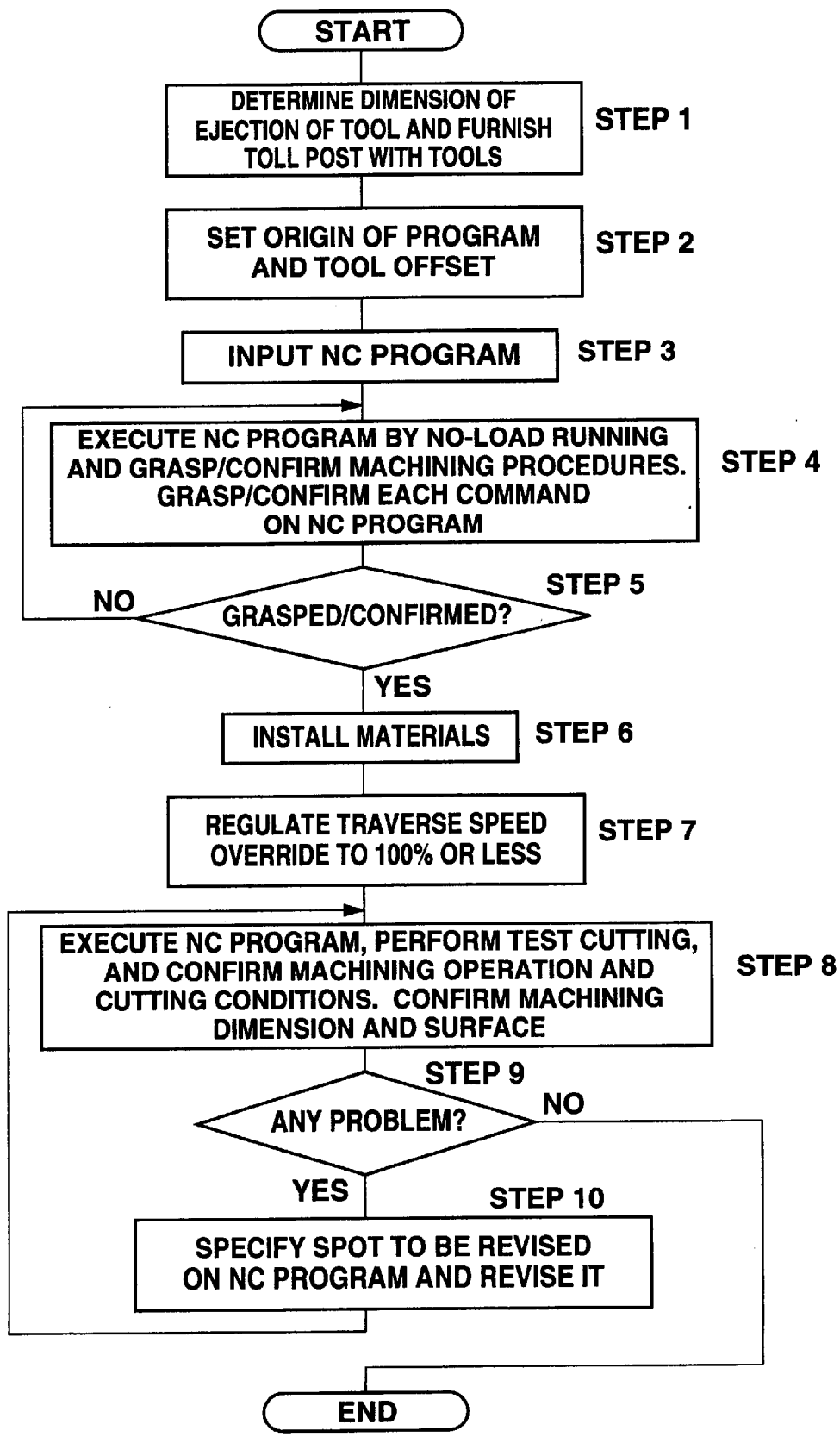
FIG. 1 is a flowchart showing procedures for adjusting an NC program.
Figure 2:
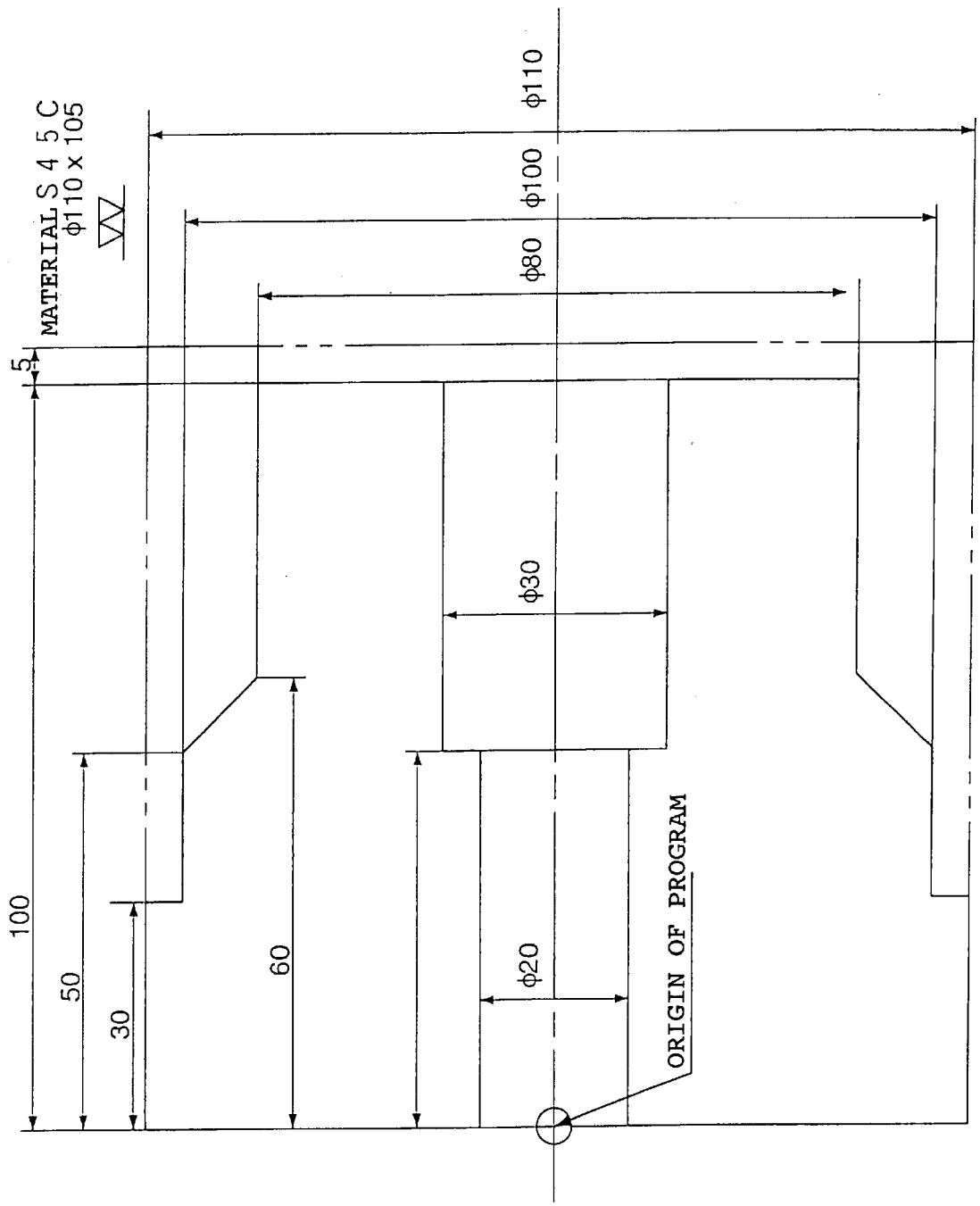
FIG. 2 shows an example of drawings for machining.

Further, according to the present invention, it is possible to automatically generate input data for the CAD-CAM system or the automatic programming unit by inputting the NC program 1 which is made by handwork without using the CAD-CAM system or the automatic programming unit, by fetching a classification of machining which is specified by the machining type specifying section 7 shown in FIG. 1 and stored in the machining support information storage memory 13 and an area to be machined which is specified by the machining area generating section 9 and stored in the machining support information storage memory 13, and by converting into a form which allows a machining information converting section 23 to input them in the CAD-CAM system or the automatic programming unit. As a result, it is possible to utilize input data for the CAD-CAM system or the automatic programming unit in a manner applicable to the progress of these units in the future.

According to the present invention, the blocks for execution described above can be recorded in a medium in a form of a computer program to be executed by a computer as extracting procedures of the machining procedures based on the NC program 1. Usually, such a medium can be provided as a floppy disk, a hard disk, a ROM, a CD memory, or the like.

It should also be noted that while the above description was based on an example of turning, it is obvious that any other suitable operation, such as milling, can also be executed in a similar manner. Further, while in this embodiment, a CRT display unit was described as an example of an output unit, other devices, such a printer or the like, may be employed as preferable.

As described above, if the NC machining support method and device according to the present invention is employed, it is possible to automatically extract, store, and output, as occasion demands, systematically combined information concerning machining, such as areas to be machined, tools to be used for machining the respective areas, intended uses of the respective tools, tool routes, cutting conditions, or a work piece model in the middle of machining based on limited information, such as an NC program, a drawing for machining, or a tool list, which is notified to a machining site from a programming room. Further, it is possible to automatically compute a fitting dimension of tool suitable for the machining procedures and optimum cutting conditions suitable for the fitting dimension and output them as occasion demands.

As a result, the present invention obviates the machining operator's work of extracting the above information concerning machining based on limited information about machining, such as an NC program, a drawing for machining, and a tool list, and thereby eases the burden on the machining operator and radically reduces the time required for preparatory work for machining. Further, it is possible to eliminate human error which may arise and thereby improve reliability of the preparatory work for machining.

Further, if the present invention is applied, it will be possible to automatically prepare input data for a CAD-CAM system or an automatic programming unit based on an NC program made by handwork of an NC programmer. Thus, even when applied to a newly introduced or radically improved CAD-CAM system or automatic programming unit, the present invention can be utilized in an efficient and expansive manner.

What is claimed is:

1. An NC machining support device comprising:
   machining procedure extracting means for extracting machining procedures based on a machining command on an NC program in NC machining in which machining control is carried out using the NC program; and
   machining procedure outputting means for outputting said machining procedures extracted, wherein said machining procedure extracting means include work piece model generating means for generating a work piece model at a point of exchanging tools from an NC program, shapes of tools, and shapes of materials every time said tools are exchanged, and said machining procedure outputting means include work piece model outputting means for outputting the generated work piece model.

2. The NC machining support device according to claim 1, wherein said machining procedure extracting means include cutting condition extracting means for combining and extracting a tool number and cutting conditions from an NC program, and said machining procedure outputting means include cutting condition outputting means for outputting the extracted cutting conditions.

3. The NC machining support device according to claim 1, wherein said machining procedure extracting means include tool route generating means for combining and generating a tool number and a tool route from an NC program, and said machining procedure outputting means include tool route outputting means for outputting the generated tool route.

4. The NC machining support device according to claim 1, wherein said machining procedure extracting means include machining type specifying means for combining and specifying a tool number and a classification of machining from an NC program or the NC program and classifications of tools, and said machining procedure outputting means include machining type outputting means for outputting the specified classification of machining.

5. The NC machining support device according to claim 1, wherein said machining procedure extracting means include machining area generating means for combining and generating a tool number and an area to be machined from an NC program, shapes of tools, and shapes of materials, and said machining procedure outputting means include machining area outputting means for outputting the generated machining area.

6. The NC machining support device according to claim 1, wherein said machining procedure outputting means include comment outputting means for inserting said machining procedures extracted in an NC program as a comment.

7. An NC machining support method comprising:
a machining procedure extracting step of extracting machining procedures based on a machining command on an NC program in NC machining in which machining control is carried out using the NC program; and
a machining procedure outputting step of outputting the extracted machining procedures, wherein said machining procedure extracting step includes a work piece model generating step of generating a work piece model at a point of exchanging tools from an NC program, shapes of tools, and shapes of materials every time said tools are exchanged, and said machining procedure outputting step includes a work piece model outputting step of outputting the generated work piece model.

8. The NC machining support method according to claim 7, wherein said machining procedure extracting step includes a cutting condition extracting step of combining and extracting a tool number and cutting conditions from an NC program, and said machining procedure outputting step includes a cutting condition outputting step of outputting the extracted cutting conditions.

9. The NC machining support method according to claim 7, wherein said machining procedure extracting step includes a tool route generating step of combining and generating a tool number and a tool route from an NC program, and said machining procedure outputting step includes a tool route outputting step of outputting the generated tool route.

10. The NC machining support method according to claim 7, wherein said machining procedure extracting step includes a machining type specifying step of combining and specifying a tool number and a classification of machining from an NC program or the NC program and classifications of tools, and said machining procedure outputting step includes a machining type outputting step of outputting the specified classification of machining.

11. The NC machining support method according to claim 7, wherein said machining procedure extracting step includes a machining area generating step of combining and generating a tool number and an area to be machined from an NC program, shapes of tools, and shapes of materials, and said machining procedure outputting step includes a machining area outputting step of outputting the generated machining area.

12. The NC machining support method according to claim 7, wherein said machining procedure outputting step includes a comment outputting step of inserting said machining procedures extracted in an NC program as a comment.

13. An NC machining support device comprising:
fitting dimension computing means for computing a fitting dimension of a tool to be used for machining based on a machining command on an NC program in NC machining in which machining control is carried out using the NC program; and
fitting dimension outputting means for outputting the computed fitting dimension.

14. The NC machining support device according to claim 13, further comprising optimum cutting condition computing means for computing cutting conditions corresponding to said fitting dimension computed and optimum cutting condition outputting means for outputting said optimum cutting conditions computed.

15. An NC machining support method comprising:
a fitting dimension computing step of computing a fitting dimension of a tool to be used for machining based on a machining command on an NC program in NC machining in which machining control is carried out using the NC program; and
a fitting dimension outputting step of outputting the computed fitting dimension.

16. The NC machining support method according to claim 15, further comprising an optimum cutting condition computing step of computing cutting conditions corresponding to said fitting dimension computed and an optimum cutting condition outputting step of outputting said optimum cutting conditions computed.

17. An NC machining support device comprising:
machining type specifying means for specifying a classification of machining from an NC program and classifications of tools in NC machining in which machining control is carried out by the NC program;
machining area generating means for generating an area to be machined from the NC program, shapes of tools, and shapes of materials; and
means for converting said classification of machining specified and said machining area generated into a format which can be input to an automatic programming unit.

18. An NC machining support method comprising:

a machining type specifying step of specifying a classification of machining from an NC program and classifications of tools in NC machining in which machining control is carried out by the NC program;

a machining area generating step of generating an area to be machined from the NC program, shapes of tools, and shapes of materials; and a step of converting said classification of machining specified and said machining area generated into a format which can be input to an automatic programming unit.

19. A medium in which a program which, when executed, causes a computer to carry out procedures for extracting, storing, and outputting machining procedures based on a machining command within an NC program, wherein said procedure for extracting machining procedures includes a work piece model generating step of generating a work piece model at a point of exchanging tools from the NC program, shapes of tools, and shapes of materials every time said tools are exchanged, and said machining procedures outputting procedure includes a work piece model outputting step of outputting the generated work piece model.

* * * * *